US005919271A

United States Patent [19]

Baillely et al.

[11] Patent Number: 5,919,271

[45] Date of Patent: Jul. 6, 1999

[54] DETERGENT COMPOSITION COMPRISING CELLULASE ENZYME AND NONIONIC CELLULOSE ETHER

[75] Inventors: Gerard Marcel Baillely, Gosforth Newcastle upon Tyne; Robin Gibson Hall; Nour-Eddine Guedira, both of Newcastle upon Tyne, all of United Kingdom

[73] Assignee: Procter & Gamble Company, Cincinnati, Ohio

[21] Appl. No.: 08/860,124

[22] PCT Filed: Dec. 21, 1995

[86] PCT No.: PCT/US95/16432

§ 371 Date: Jun. 30, 1997

§ 102(e) Date: Jun. 30, 1997

[87] PCT Pub. No.: WO96/20997

PCT Pub. Date: Jul. 11, 1996

[30] Foreign Application Priority Data

Dec. 31, 1994 [GB] United Kingdom ................... 9426458

[51] Int. Cl.[6] .............................. C12S 11/00; C12S 9/00; C11D 3/22; C11D 3/386

[52] U.S. Cl. ............................. 8/137; 510/283; 510/292; 510/299; 510/300; 510/320; 510/321; 510/392; 510/473; 510/530

[58] Field of Search .................................... 510/283, 292, 510/299, 300, 320, 321, 392, 393, 473, 530; 8/137

[56] References Cited

U.S. PATENT DOCUMENTS

| | | | |
|---|---|---|---|
| 5,009,800 | 4/1991 | Foster | 252/8.9 |
| 5,104,555 | 4/1992 | Foster et al. | 252/8.6 |
| 5,128,055 | 7/1992 | Foster | 252/8.9 |
| 5,160,641 | 11/1992 | Foster | 252/8.6 |
| 5,540,850 | 7/1996 | Foster | 510/330 |

FOREIGN PATENT DOCUMENTS

| | | |
|---|---|---|
| 0213730 | 3/1987 | European Pat. Off. . |
| 0320296 | 6/1989 | European Pat. Off. . |
| 0495257 | 11/1991 | European Pat. Off. . |
| 0495257 | 7/1992 | European Pat. Off. . |

*Primary Examiner*—Kery Fries
*Attorney, Agent, or Firm*—Kim William Zerby; Brian M. Bolam; Richard S. Echler, Sr.

[57] ABSTRACT

The invention relates to a detergent composition which comprises a nonionic polysaccharide ether, a surfactant, a dye transfer inhibition agent, a cellulase enzyme and a chelating agents. In addition the invention further relates to a method of treating fabrics with the detergent composition.

12 Claims, No Drawings

DETERGENT COMPOSITION COMPRISING CELLULASE ENZYME AND NONIONIC CELLULOSE ETHER

FIELD OF THE INVENTION

The present invention relates to detergent compositions for improved clay stain removal comprising a nonionic polysaccharide ether and a cellulolytic enzyme.

BACKGROUND OF THE INVENTION

During the laundering operation of fabrics it is highly desirable to provide the fabric, particularly man-made fabrics produced from synthetic fibres, with soil release properties.

Due to the hydrophobic nature of fabrics composed of partially or completely synthetic fibres, the removal of greasy soils and stains therefrom is particularly difficult. In order to address this problem, soil release polymers may be incorporated into the detergent composition. During laundering the soil release agents are adsorbed onto the surface of the fabric, thereby inducing greater hydrophobicity to the fabric surface. Once the fabric is treated with a soil release agent, the ease of removal of soils and stains from the surface of the fabric is considerably improved.

The main types of soil release agents incorporated into detergent compositions, which provide benefits to primarily hydrophobic synthetic fabrics include synthetic soil release agents, preferably terephthalate based and polysaccharide ethers. Polysaccharide ethers such as cellulose ethers have been described for example in GB 1 534 641, which discloses nonionic surfactant detergent compositions comprising cellulose ether soil release agents such as alkyl and hydroxyalkyl cellulose ethers.

The soil release performance of the polysaccharide ethers may be improved upon greasy/oily stains by increasing the degree of substitution and the chain length of the subsitutent. This results in the polysaccharide ether being only weakly and temporarily bound to the fabric surface and thus easily removed once soiling has occurred.

The soil release performance of the polysaccharide ethers may further improved by increasing the amount of polysaccharide ether used and or by increasing the molecular weight or degree of polymerisation (dp). However, high molecular weight polysaccharide ethers are known to have detrimental effects on the clay soil removal and anti-redeposition performance of the detergent composition in which they are incorporated. This is particularly evident on fabrics after a number of repeated washing cycles or when high dosage or concentrations of detergent composition are utilised to clean heavily soiled fabric. Furthermore, this problem is also acute on fabrics which contain a high percentage of synthetic fibres.

During the laundering operation it is also desirable reduce the effects of aging on the fabrics. Aging of naturally based fabrics results in the damage of the top surface fibres which increases the number of soil collection sites and results in the fabric gaining an unhomogeneous feel. This may be addressed by the incorporation of cellulolytic enzymes into detergent compositions. The cellulolytic enzyme removes the damaged surface fibres and thereby improves stain removal, fabric appearance and reduces the hardness of the fabric after multiple washing. However, the cellulolytic enzyme by its very nature hydrolyses and depolymerises polysaccharide ethers having 1,4 β-glucosidic bonds. This problem of cellulase and polysaccharide ether incompatibility is particularly acute for low substituted polysaccharide ethers which appear more 'cellulosic' in nature.

Thus, it is an aim of the present invention to provide a detergent composition comprising a cellulolytic enzyme and a nonionic polysaccharride ether, whereby the soil release performance of the polysaccharide is enhanced by the presence of the cellulolytic enzyme.

It has now been found that this objective can be achieved by the use of selected nonionic polysaccharide ethers having specified degrees of polymerisation and substitution. It is believed that the nonionic polysaccharide ethers of the present invention can be deposited onto the fabric surface prior to the start of degradation by the cellulolytic enzyme.

In addition, a further advantage of the present invention is that the subsequent cellulolytic enzyme attack upon the polysaccharides after their deposition on the fabric, aids the removal of trapped particulate soils and clay soil removal.

Another advantage of the present invention is that high molecular nonionic polysaccharide ethers may be used in combination with cellulase to provide soil release benefits without affecting the clay soil removal performance.

A further advantage of the present invention is that the detergent composition delivers improved whiteness performance and fabric feel.

Nonionic polysacchairdes and cellulolytic enzymes have been described in the art. EPO 495 257 discloses a compact detergent composition comprising high activity cellulolytic enzyme. Anti-redepositioin agents such as cellulose derivatives are disclosed, in particular methyl cellulose, carboxymethylcellulose (CMC) and hydroxyethyl cellulose. Only CMC and cellulolytic enzyme is exemplified and there is no disclosure of the specific combination of cellulolytic enzyme and cellulose ether.

EPO 320 296 discloses fabric softening additives for detergent compositions comprising a water soluble nonionic ethyl hydroxyethyl cellulose having an HLB of 3.3 to 3.8, a dp of 50 to 1200 and a ds of 1.9 to 2.9. Enzymes including cellulolytic enzyme are disclosed. The combination of cellulose ether and cellulolytic enzyme is not exemplified.

EPO 213 730 discloses detergent compositions with fabric softening properties comprising a nonionic substituted cellulose ether derivative, having a ds of from 1.9 to 2.9 and dp of 50 to 1200. Enzymes such as cellulolytic enzyme are mentioned. The combination of cellulose ether and cellulolytic enzyme is not exemplified.

EPO 173 397 discloses detergent compositions comprising a cationic softening agent and a fungal cellulolytic enzyme. Soil suspending agents such as water soluble salts of CMC, carboxyhydroxymethyl cellulose are disclosed. Their preferred dp or ds values are not mentioned.

SUMMARY OF THE INVENTION

The present invention is a detergent composition comprising at least 1% of a surfactant system, characterised in that said system comprises a nonionic polysaccharide ether having a 1,4 β-glucosidic bond, a degree of polymerisation of 100 or more and a degree of subsitution of from 0.5 to 2.8 inclusive or mixtures thereof, in combination with a cellulolytic enzyme.

All amounts, weights and ratios as used herein are as a % weight of the detergent composition.

DETAILED DESCRIPTION OF THE INVENTION

Nonionic Polysaccharide Ethers

According to the present invention an essential component of the detergent composition is a nonionic polysaccharide ether having a 1,4 β-glucosidic bond. Chemically, the polysaccharides are composed of pentoses or hexoses. Suitable polysaccharide ethers for use herein are selected from cellulose ethers, starch ethers, dextran ethers and mixtures thereof. Preferably said nonionic polysaccharide ether is a cellulose ether. Cellulose ethers are generally obtained from vegetable tissues and fibres, including cotton and wood pulp.

The hydroxy group of the anhydro glucose unit of cellulose can be reacted with various reagents thereby replacing the hydrogen of the hydroxyl group with other chemical groups. Various alkylating and hydroxyalkylating agents can be reacted with cellulose ethers to produce either alkyl-, hydroxyalkyl- or alkylhydroxyalkyl-cellulose ethers or mixtures thereof. The most preferred for use in the present invention are $C_1$–$C_4$ alkyl cellulose ether or a $C_1$–$C_4$ hydroxyalkyl cellulose ether or a $C_1$–$C_4$ alkylhydroxy alkyl cellulose ether or mixtures thereof. Preferably the polysaccharides of the present invention have a degree of substitution of from 0.5 to 2.8, preferably from 0.5 to 2.2, most preferably from 0.5 to 2 inclusive.

Suitable cellulose ethers include methylcellulose ether, hydroxypropyl methylcellulose ether, hydroxyethyl methylcellulose ether, hydroxypropyl cellulose ether, hydroxybutyl methylcellulose ether, ethylhydroxy ethylcellulose ether, ethylcellulose ether and hydroxy ethylcellulose ether. Most preferably said polysaccharide is a methylcellulose ether. Such agents are commercially available such as METHOCEL (Dow Chemicals) and Bermocoll (Nobel). The nonionic polysaccharides of the present invention in addition to the nonionic substituent may also be partially charged. For example by replacing one of the hydroxy groups with an anionic group.

According to the present invention said polysaccharide ether has a degree of polymerisation of more than 100. As used herein the term degree of polymerisation (dp) is the ratio of the weight average molecular weight on average molecular unit weight, i.e. $dp=MW_W/MUW$. The weight average molecular weight ($MW_W$) is obtained by standard analytical methods as described in Polymer handbooks. A preferred method is light scattering from polymer solutions as originally defined by Debye.

For example the average molecular unit weight (MUW) for methylcellulose ether may be determined from the sum of the molecular weight of the unsubstituted cellulose unit and the product of the degree of polymerisation and the molecular weight of the substituent less the hydrogen mass (1).

i.e. $MUW=162+(15-1)*$ ds -for methyl substituents found in methyl cellulose ethers.

MUW may also be determined from the "% methoxyl content" value (mc) also used by manufactures of methyl cellulose ethers instead of the degree of substitution, such that;

$$MUW=100-[(\text{mol. wt. of } CH_2/\text{mol. wt. of } OCH_3)*mc]$$

The compositions of the present invention comprise from 0.01% to 10%, preferably from 0.01% to 3%, most preferably from 0.1% to 2% of said nonionic polysaccharide ethers.

Cellulolytic Enzyme

In the present specification and claims, the terms "cellulase" and "cellulolytic" denote an enzyme that hydrolyses cellulose. The cellulase component may be a component occurring in a cellulase system produced by a given microorganism, such a cellulase system mostly comprising several different cellulase enzyme components including those usually identified as e.g. cellobiohydrolases, exo-cellobiohydrolases, endoglucanases, β-glucosidases.

Alternatively, the cellulase component may be a single component, i.e. a component essentially free of other cellulase components usually occurring in a cellulase system produced by a given microorganism, the single component being a recombinant component, i.e. produced by cloning of a DNA sequence encoding the single component and subsequent cell transformed with the DNA sequence and expressed in a host, cf. e.g. International Patent Applications WO 91/17243 and WO 91/17244 which are hereby incorporated by reference. The host is preferably a heterologous host, but the host may under certain conditions also be the homologous host.

The term "particulate soil removal", as used herein, refers to enhanced cleaning of cellulose-containing fabrics or garment, e.g. cotton, contaminated by particles of soil or of other insoluble matter entrapped by microfibrills spreading out on the fibre surface.

The term "retaining-type activity", as used herein, is intended to mean the stereochemical course of hydrolysis catalysed by a cellulase wherein the mechanism (of a retaining glycosidase) is as shown in Chem. Rev., 90, p. 1171–1202 (1990) (Sinott, M. L.: Catalytic mechanism of enzymatic glycosyl transfer). Both the cleavage product leaving the active site of the cellulase having retaining-type activity as well as the substrate is in β-configuration, cf. Eur. J. Biochem, 217, p. 947–953 (1993).

The term "inverting-type activity", as used herein, is intended to mean the stereochemical course of hydrolysis catalysed by a cellulase wherein the mechanism (of an inverting glycosidase) is as shown in Chem. Rev., 90, p. 1171–1202 (1990) (Sinott, M. L.: Catalytic mechanism of enzymatic glycosyl transfer) and Eur. J. Biochem, 217, p. 947–953 (1993).

The stereochemistry of hydrolysis of the glycosidic bond is firmly dictated by the structure and topology of the enzyme active site and is usually interpreted as the result of a single-displacement or double displacement catalytic mechanism. It is believed that all enzymes in a given cellulase family, cf. Gene (Amst.), 81, p. 83–95 (1989) and Biochem. J., 293, p. 781–788 (1993), have a similar fold even when their amino acid conservation is extremely low, and it is furthermore shown that members of a given cellulase family all have the same general fold and topology (J. Biochem, 217, p. 947–953 (1993)).

Furthermore, it is contemplated that the cellulase may have an exo-mode of action, the term "exo-mode of action" being intended to mean initiating degradation of cellulose from the non-reducing chain ends by removing cellobiose units.

Alternatively, it is contemplated that the cellulase may have an endo-mode of action, the "endo-mode of action" being intended to mean hydrolysing amorphous regions of low crystallinity in cellulose fibres.

The term "domain", as used herein, is intended to indicate an amino acid sequence capable of effecting a specific task. For example is the term "carbohydrate binding domain" or "cellulose binding domain" ("CBD") intended to indicate an amino acid sequence capable of effecting binding of the enzyme to a carbohydrate substrate, in particular cellulose, and the term "catalytic active domain" ("CAD") is intended to indicate an amino sequence capable of effecting catalytic cleavage and having one or more active sites. A CBD is an example of a non-catalytic domain. CAD's and CBD's may be linked or attached by linking regions. Cf. Trends Biotechnol., 5, p. 255–261 (1987) and Microbiol. Rev., 55, p. 303–315 (1991).

The term "core enzyme", as used herein, is intended to indicate an enzyme consisting essentially of a single domain, i.e. a catalytic active domain, the core enzyme having no "tail".

The term "activity towards dyed microcrystalline cellulose" as used herein refers to a hydrolytic activity towards microcrystalline cellulose covalently labelled with a light absorbing/fluorogenic compound, e.g. a reactive dye, determined spectroscopically by measuring the liberation of labelled products resulting from hydrolysis under conditions simulating washing conditions with respect to alkaline pH, temperature, duration, agitation and detergent concentrations.

Accordingly, a cellulase exhibiting catalytic activity towards dyed microcrystalline cellulose must be active in releasing labelled soluble products from modified microcrystalline cellulose under simulated washing conditions.

The term "activity towards short cellooligosaccharides" as used herein, refers to an activity towards cellooligosaccharides containing two glucose units and an additional leaving group, such as e.g. a glucose unit, or a modified glucose unit, or a chromogenic/fluorogenic group, or other groups, resulting in splitting the glycosidic bond and measured as reducing end recovery or chromogenic or fluorogenic label compound liberation under hydrolysis under conditions simulating washing conditions with respect to alkaline pH, temperature, duration, agitation and detergent concentrations.

Accordingly, a cellulase exhibiting a catalytic activity towards short cellooligosaccharides must be active in hydrolysis of short cellooligosaccharides under washing conditions, the cellooligosaccharides containing two glucose units and an additional leaving group, such as e.g. a glucose unit, or a modified glucose unit, or a chromogenic/fluorogenic group, or other groups.

In the present context, the term "immunoreactive" is intended to indicate that the produced protein is reactive with an antibody raised against a native cellulose- or nemicellulose-degrading enzyme.

In the present context, the term "homologue" is intended to indicate a polypeptide encoded by DNA which hybridizes to the same probe as the DNA coding for the cellulase component with the amino acid sequence in question under certain specified conditions (such as presoaking in 5× SSC and prehybridising for 1 h at ~40° C. in a solution of 20% formamide, 5× Denhardt's solution, 50 mM sodium phosphate, pH 6.8, and 50 μg of denatured sonicated calf thymus DNA, followed by hybridization in the same solution supplemented with 100 μM ATP for 18 h at ~40° C.). The term is intended to include derivatives of the sequence in question obtained by addition of one or more amino acid residues to either or both the C- and N-terminal of the native sequence substitution of one or more amino acid residues at one or more sites in the native sequence, deletion of one or more amino acid residues at either or both ends of the native amino acid sequence or at one or more sites within the native sequence, or insertion of one or more amino acid residues at one or more sites in the native sequence. It is to be understood that any derivative also hybridizes to the same probe as mentioned above which indicates that the cellulase enzyme derivatives within the scope of the present invention all have the same advantageous activity and effect as the cellulase component having the amino acid sequence in question. Also, any additions or substitutions or deletions or insertions may preferably relate to a relatively limited number of amino acids of the sequence in question, i.e. minor additions, substitutions, deletions or insertions, since it is to be expected that major additions, substitutions, deletions or insertions may result in cellulase components (polypeptides) which do not fulfil the above-mentioned hybridizing requirement.

The present invention relates to a detergent composition comprising a cellulase having retaining-type activity and being capable of particulate soil removal or a cellulase having multiple domains comprising at least one non-catalytic domain attached to a catalytic domain and being capable of colour clarification. Preferably the cellulase is a single (recombinant) component.

The cellulase may be obtained from the microorganism in question by use of any suitable technique. For instance, a cellulase preparation may be obtained by fermentation of a microorganism and subsequent isolation of a cellulase containing preparation from the fermented broth or microorganism by methods known in the art, but more preferably by use of recombinant DNA techniques as known in the art. Such method normally comprises cultivation of a host cell transformed with a recombinant DNA vector capable of expressing and carrying a DNA sequence encoding the cellulase component in question, in a culture medium under conditions permitting the expression of the enzyme and recovering the enzyme from the culture.

CLONING A DNA SEQUENCE ENCODING A CELLULASE

The DNA sequence encoding a parent cellulase may be isolated from any cell or microorganism producing the cellulase in question by various methods, well known in the art. First a genomic DNA and/or cDNA library should be constructed using chromosomal DNA or messenger RNA from the organism that produces the cellulase to be studied. Then, if the amino acid sequence of the cellulase is known, homologous, labelled oligonucleotide probes may be synthesized and used to identify cellulase-encoding clones from a genomic library of bacterial DNA, or from a fungal cDNA library. Alternatively, a labelled oligonucleotide probe containing sequences homologous to cellulase from another strain of bacteria or fungus could be used as a probe to identify cellulase-encoding clones, using hybridization and washing conditions of lower stringency.

Yet another method for identifying cellulase-producing clones would involve inserting fragments of genomic DNA into an expression vector, such as a plasmid, transforming cellulase-negative bacteria with the resulting genomic DNA library, and then plating the transformed bacteria onto agar containing a substrate for cellulase. Those bacteria containing cellulase-bearing plasmid will produce colonies surrounded by a halo of clear agar, due to digestion of the substrate by secreted cellulase.

Alternatively, the DNA sequence encoding the enzyme may be prepared synthetically by established standard methods, e.g. the phosphoamidite method described by S. L. Beaucage and M. H. Caruthers, *Tetrahedron Letters* 22, 1981, pp. 1859–1869, or the method described by Matthes et al., *The EMBO J.* 3, 1984, pp. 801–805. According to the phosphoamidite method, oligonucleotides are synthesized, e.g. in an automatic DNA synthesizer, purified, annealed, ligated and cloned in appropriate vectors.

Finally, the DNA sequence may be of mixed genomic and synthetic, mixed synthetic and cDNA or mixed genomic and cDNA origin prepared by ligating fragments of synthetic, genomic or cDNA origin (as appropriate), the fragments corresponding to various parts of the entire DNA sequence, in accordance with standard techniques. The DNA sequence may also be prepared by polymerase chain reaction (PCR) using specific primers, for instance as described in U.S. Pat. No. 4,683,202 or R. K. Saiki et al., *Science* 239, 1988, pp. 487–491.

EXPRESSION OF CELLULASE VARIANTS

According to the invention, a mutated cellulase-coding sequence produced by methods described above, or any alternative methods known in the art, can be expressed, in enzyme form, using an expression vector which typically includes control sequences encoding a promoter, operator, ribosome binding site, translation initiation signal, and, optionally, a repressor gene or various activator genes. To permit the secretion of the expressed protein, nucleotides encoding a "signal sequence" may be inserted prior to the cellulase-coding sequence. For expression under the direction of control sequences, a target gene to be treated according to the invention is operably linked to the control sequences in the proper reading frame. Promoter sequences that can be incorporated into plasmid vectors, and which can support the transcription of the mutant cellulase gene, include but are not limited to the prokaryotic β-lactamase promoter (Villa-Kamaroff, et al., 1978, Proc. Natl. Acad. Sci. U.S.A. 75:3727–3731) and the tac promoter (DeBoer, et al., 1983, Proc. Natl. Acad. Sci. U.S.A. 80:21–25). Further references can also be found in "Useful proteins from recombinant bacteria" in Scientific American, 1980, 242:74–94.

According to one embodiment *B. subtilis* is transformed by an expression vector carrying the mutated DNA. If expression is to take place in a secreting microorganism such as *B. subtilis* a signal sequence may follow the translation initiation signal and precede the DNA sequence of interest. The signal sequence acts to transport the expression product to the cell wall where it is cleaved from the product upon secretion. The term "control sequences" as defined above is intended to include a signal sequence, when is present.

In a currently preferred method of producing cellulase variants of the invention, a filamentous fungus is used as the host organism. The filamentous fungus host organism may conveniently be one which has previously been used as a host for producing recombinant proteins, e.g. a strain of Aspergillus sp., such as *A. niger, A. nidulans* or *A. oryzae*. The use of *A. oryzae* in the production of recombinant proteins is extensively described in, e.g. EP 238 023.

For expression of cellulase variants in Aspergillus, the DNA sequence coding for the cellulase variant is preceded by a promoter. The promoter may be any DNA sequence exhibiting a strong transcriptional activity in Aspergillus and may be derived from a gene encoding an extracellular or intracellular protein such as an amylase, a glucoamylase, a protease, a lipase, a cellulase or a glycolytic enzyme.

Examples of suitable promoters are those derived from the gene encoding *A. oryzae* TAKA amylase, *Rhizomucor miehei* aspartic proteinase, *A. niger* neutral α-amylase, *A. niger* acid stable α-amylase, *A. niger* glucoamylase, *Rhizomucor miehei* lipase, *A. oryzae* alkaline protease or *A. oryzae* triose phosphate isomerase.

In particular when the host organism is *A. oryzae*, a preferred promoter for use in the process of the present invention is the *A. oryzae* TAKA amylase promoter as it exhibits a strong transcriptional activity in *A. oryzae*. The sequence of the TAKA amylase promoter appears from EP 238 023.

Termination and polyadenylation sequences may suitably be derived from the same sources as the promoter.

The techniques used to transform a fungal host cell may suitably be as described in EP 238 023.

To ensure secretion of the cellulase variant from the host cell, the DNA sequence encoding the cellulase variant may be preceded by a signal sequence which may be a naturally occurring signal sequence or a functional part thereof or a synthetic sequence providing secretion of the protein from the cell. In particular, the signal sequence may be derived from a gene encoding an Aspergillus sp. amylase or glucoamylase, a gene encoding a *Rhizomucor miehei* lipase or protease, or a gene encoding a Humicola cellulase, xylanase or lipase. The signal sequence is preferably derived from the gene encoding *A. oryzae* TAKA amylase, *A. niger* neutral α-amylase, *A. niger* acid-stable α-amylase or *A. niger* glucoamylase.

The medium used to culture the transformed host cells may be any conventional medium suitable for growing Aspergillus cells. The transformants are usually stable and may be cultured in the absence of selection pressure. However, if the transformants are found to be unstable, a selection marker introduced into the cells may be used for selection.

The mature cellulase protein secreted from the host cells may conveniently be recovered from the culture medium by well-known procedures including separating the cells from the medium by centrifugation or filtration, and precipitating proteinaceous components of the medium by means of a salt such as ammonium sulphate, followed by chromatographic procedures such as ion exchange chromatography, affinity chromatography, or the like.

Both the cellulase may be recombinant (single), i.e. produced by cloning of the DNA sequence encoding the single component and cell transformation with the DNA sequence and expression in a host which may be heterologous or homologous. However, the cellulase may also be cloned and expressed in the same heterologous or homologous host.

Accordingly, the detergent composition claimed in the present invention should preferably comprise the cellulase in a concentration corresponding to a concentration in the resulting washing liquor of from 0.001 mg to 100 mg, preferably from 0.005 mg to 50 mg of cellulase protein per liter of washing liquor.

Preferably, the cellulase is a fungal or bacterial cellulase component, i.e. of fungal or bacterial origin.

It is contemplated that the cellulase may be derived or isolated and purified from microorganisms which are known to be capable of producing cellulolytic enzymes, e.g. species of Humicola, Bacillus, Trichoderma, Fusarium, Myceliophthora, Phanerochaete, Schizophyllum, Penicillium, Aspergillus, and Geotricum. The derived components may be either homologous or heterologous components. Preferably, the components are homologous. However, a heterologous component which is immunoreactive with an antibody raised against a highly purified cellulase component possessing the desired property or properties and which heterologous component is derived from a specific microorganism is also preferred.

Preferably, the cellulase exhibits catalytic activity on low molecular weight carbohydrate substrates, especially a catalytic activity on cellotriose at pH 8.5 corresponding to $k_{cat}$ of at least 0.01 $s^{-1}$.

The cellulase may be inadequate or unable of providing colour clarification, thus exhibiting low catalytic activity on dyed microcrystalline cellulose.

In a preferred embodiment of the invention, the cellulase is a core enzyme, i.e. a cellulase having no "tail" or being a single domain protein.

A convenient cellulase useful in the detergent composition of the present invention may be a cellobiohydrolase component which is immuno-reactive with an antibody raised against a highly purified ~70 kD cellobiohydrolase (EC 3.2.1.91) derived from Humicola insolens, DSM 1800, or which is a homologue or derivative of the ~70 kD cellobiohydrolase exhibiting cellulase activity. A preferred cellobiohydrolase component has the amino acid sequence disclosed in Nucleic Acid Research, vol. 18 (1990), page 668 (De Oliviera, Alzevedo, M. and Radford, A.) which is shown in the appended SEQ ID NO:1 or a variant of said cellobiohydrolase having an amino acid sequence being at least 60%, preferably at least 70%, more preferably 75%, more preferably at least 80%, more preferably 85%, especially at least 90% homologous with said sequence.

Another preferred cellobiohydrolase component is a core enzyme ("core CBH I") having an amino acid sequence consisting of 449 amino acids corresponding to the (partial) amino acid sequence numbered 1-449 of the appended SEQ ID NO:1. The core CBH I has an apparant molecular weight of ~48 kD.

Alternatively, the cellulase may be an endoglucanase component which is immunoreactive with an antibody raised against a highly purified ~50 kD endoglucanase derived from Humicola insolens, DSM 1800, or which is a homologue or derivative of the ~50 kD endoglucanase exhibiting cellulase activity. A preferred endoglucanase component has the amino acid sequence disclosed in PCT Patent Application No. WO91/17244, FIG. 14A–E, which is shown in the appended SEQ ID NO:2, or a variant of said endoglucanase having an amino acid sequence being at least 60%, preferably at least 70%, more preferably 75%, more preferably at least 80%, more preferably 85%, especially at least 90% homologous with said sequence.

Alternatively, the cellulase may be an endoglucanase component which is immunoreactive with an antibody raised against a highly purified ~50 kD (apparant molecular weight, the amino acid composition corresponds to 45 kD with 2n glycosylation sites) endoglucanase derived from *Fusarium oxysporum*, DSM 2672, or which is a homologue or derivative of the ~50 kD endoglucanase exhibiting cellulase activity. A preferred endoglucanase component has the amino acid sequence disclosed in PCT Patent Application No. WO91/17244, FIG. 13, which is shown in the appended SEQ ID NO:3, or a variant of said endoglucanase having an amino acid sequence being at least 60%, preferably at least 70%, more preferably 75%, more preferably at least 80%, more preferably 85%, especially at least 90% homologous with said sequence.

The endoglucanase herein referred to as EG I-F cellulase component is producible by *Aspergillus oryzae* after transformation with a plasmid containing the DNA sequence corresponding to the amino acid sequence of the appended SEQ ID NO:3 and using the conventional Taka promotor and AMG terminator. The EG I-F may be purified to homogeneity using cationic chromatography and has a pI>9. The calculated pI is 9 based on the amino acid composition using the PHKa values from Adv. Protein Chem. 17, p. 69–165 (1962)(C. Tanford). The molar exctinction coefficient is calculated to be 58180.

Yet another preferred cellulase may be any of the cellulases disclosed in the published European Patent Application No. EP-A2-271 004, the cellulase having a non-degrading index (NDI) of not less than 500 and being an alkalophilic cellulase having an optimum pH not less than 7 or whose relative activity at a pH of not less than 8 is 50% or over of the activity under optimum conditions when carboxy methyl cellulose (CMC) is used as a substrate; the cellulase preferably being selected from the group consisting of alkaline cellulase K (produced by Bacillus sp. KSM-635, FERM BP 1485); alkaline cellulase K-534 (produced by Bacillus sp. KSM-534, FERM BP 1508); alkaline cellulase K-539 (produced by Bacillus sp. KSM-539, FERM BP 1509); alkaline cellulase K-577 (produced by Bacillus sp. KSM-577, FERM BP 1510); alkaline cellulase K-521 (produced by Bacillus sp. KSM-521, FERM BP 1507); alkaline cellulase K-580 (produced by Bacillus sp. KSM-580, FERM BP 1511); alkaline cellulase K-588 (produced by Bacillus sp. KSM-588, FERM BP 1513); alkaline cellulase K -597 (produced by Bacillus sp. KSM-597, FERM BP 1514); alkaline cellulase K-522 (produced by Bacillus sp. KSM-522, FERM BP 1512); CMCase I, CMCase II (both produced by Bacillus sp. KSM-635, FERM BP 1485); alkaline cellulase E-II and alkaline cellulase E-III (both produced by Bacillus sp. KSM-522, FERM BP 1512).

Alternatively, the cellulase may be capable of colour clarification and has multiple domains, i.e. one or more catalytic domains attached to one or more non-catalytic domains, e.g. cellulose binding domains, since the activity in respect of colour clarification is enhanced by the presence of e.g. a cellulose binding domain.

This cellulase may have retaining-ype activity or inverting-type activity.

Preferably, the cellulase exhibits high catalytic activity on cellodextrin(s), more preferably on relatively long-chained cellodextrin(s), especially on reduced longer-chained cellodextrin(s).

In a preferred embodiment of the invention, the cellulase exhibits high catalytic activity on dyed microcrystalline cellulose, especially on Red Avicel.

Cellulase useful as colour clarifying components in the detergent composition of the present invention usually exhibits essentially no catalytic activity on low molecular weight carbohydrate substrates. Preferably, the cellulase has a catalytic activity on low molecular weight carbohydrate substrates, especially on cellotriose, at pH 8.5 corresponding to $k_{cat}$ of below 0.01 $s^{-1}$; more preferably the cellulase exhibits essentially no catalytic activity on cellotriose, i.e. the component is not capable of hydrolysing cellotriose but capable of hydrolysing higher oligomers of β-1,4-glucose units.

A convenient cellulase useful in the detergent composition of the present invention may be an endoglucanase component which is immunoreactive with an antibody raised against a highly purified ~43 kD endoglucanase derived from Humicola insolens, DSM 1800, or which is a homologue or derivative of the ~43 kD endoglucanase exhibiting cellulase activity. A preferred endoglucanase component has the amino acid sequence disclosed in PCT Patent Application No. WO 91/17243, SEQ ID#2, which is shown in the appended SEQ ID NO:4, or a variant of said endoglucanase having an amino acid sequence being at least 60%, preferably at least 70%, more preferably 75%, more preferably at least 80%, more preferably 85%, especially at least 90% homologous with said sequence.

Another preferred endoglucanase component comprises an amino acid sequence encoded by the partial DNA sequence disclosed in PCT Patent Application No. WO93/11249; SEQ ID#11, which is shown in the appended SEQ ID NO:5, or a variant of said endoglucanase having an amino acid sequence being at least 60%, preferably at least 70%, more preferably 75%, more preferably at least 80%, more preferably 85%, especially at least 90% homologous with said sequence.

Yet another preferred endoglucanase component comprises an amino acid sequence encoded by the partial DNA sequence disclosed in PCT Patent Application No. WO 93/11249, SEQ ID#9, which is hereby incorporated by reference.

Yet another preferred endoglucanase component comprises an amino acid sequence encoded by the partial DNA sequence disclosed in PCT Patent Application No. WO93/11249, SEQ ID#7, which is hereby incorporated by reference. In example 1 below, the endoglucanase component is referred to as EG III.

Alternatively, the cellulase may be an endoglucanase component which is immunoreactive with an antibody raised against a highly purified ~60 kD endoglucanase derived from *Bacillus lautus*, NCIMB 40250, or which is a homologue or derivative of the ~60 kD endoglucanase exhibiting cellulase activity. A preferred endoglucanase component has the amino acid sequence disclosed in PCT Patent Application No. WO 91/10732, SEQ ID#7, which is shown in the appended SEQ ID NO:6, or a variant of said endoglucanase having an amino acid sequence being at least 60%, preferably at least 70%, more preferably 75%, more preferably at least 80%, more preferably 85%, especially at least 90% homologous with said sequence.

According to the present invention the detergent composition comprises from 0.001% to 2%, preferably from 0.01% to 1%, most preferably from 0.05% to 0.5% of said 1000CEVU active cellulolytic enzyme. According to the present invention the detergent compositions comprise said polysaccharide and cellulolytic enzyme in a ratio of from 100:1 to 1:100, preferably from 10:1 to 1:10, more preferably from 5:1 to 1:5.

Detersive Surfactants

According to the present invention the detergent composition comprises at least 1% of a surfactant system. Surfactants useful herein include the conventional $C_{11}$–$C_{18}$ alkyl benzene sulphonates ("LAS") and primary, branched-chain and random $C_{10}$–$C_{20}$ alkyl sulphates ("AS"), the $C_{10}$–$C_{18}$ secondary (2,3) alkyl sulphates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulphates such as oleyl sulphate, the $C_{10}$–$C_{18}$ alkyl alkoxy sulphates ("$AE_xS$"; especially EO 1–7 ethoxy sulphates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulphated polyglycosides, and $C_{12}$–$C_{18}$ alpha-sulphonated fatty acid esters.

If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulphobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branchedchain $C_{10}$–$C_{16}$ soaps may be used. Mixtures of anionic and nonionic surfactants are especially useful. Other conventional useful surfactants such as cationics are listed in standard texts.

According to the present invention the compositions comprise from 1% to 80%, preferably from 5% to 50%, most preferably from 10% to 40% of a surfactant. Preferred surfactants for use herein are linear alkyl benzene sulphonate, alkyl sulphates and alkyl alkoxylated nonionics or mixtures thereof.

Optional Ingredients

According to the present invention the detergent compositions may comprise a number of optional conventional detergent adjuncts such as builders, chelants, polymers, antiredeposition agents and the like.

Builders

Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least 1% builder. Liquid formulations typically comprise from 5% to 50%, more typically about 5% to 30%, by weight, of detergent builder. Granular formulations typically comprise from 10% to 80%, more typically from 15% to 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, orthophosphates and glassy polymeric meta-phosphates), phosphonates, phytic acid, silicates, carbonates (including bicarbonates and sesquicarbonates), sulphates, and aluminosilicates (see, for example, U.S. Pat. Nos. 3,159,581; 3,213,030; 3,422,021; 3,400,148 and 3,422,137).

However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the Na SKS6 silicate builder does not contain aluminum. NaSKS-6 has the delta-$Na_2Si_2O_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1}\cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2Si_2O_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z[(SiO_2)_w(zAlO_2)_y]\cdot xH_2O$$

wherein w, z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}]\cdot xH_2O$$

wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compound, disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

Chelating Agents

The detergent compositions herein may also optionally contain one or more iron and/or manganese chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at least low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

If utilized, these chelating agents will generally comprise from 0.1% to 10% more preferably, from 0.1% to 3.0% by weight of such compositions.

Polymeric Soil Release Agent

Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, or (iii) poly (vinyl ester) segments, preferably polyvinyl acetate), having a degree of polymerization of at least 2.

Typically, the polyoxyethylene segments of (a)(i) will have a degree of polymerization of from about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S(CH_2)_nOCH_2CH_2O$—, where M is sodium and n is an integer from 4–6 , as disclosed in U.S. Pat. No. 4,721,580, issued Jan. 26, 1988 to Gosselink.

Polymeric soil release agents useful in the present invention also include cellulosic derivatives such as copolymeric blocks of ethylene terephthalate or propylene terephthalate with polyethylene oxide or polypropylene oxide terephthalate, and the like.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

One type of preferred soil release agent is a copolymer having random blocks of ethylene terephthalate an d polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from Icl). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoarolyl, end-capped terephthalate esters.

If utilized, soil release agents will generally comprise from about 0.01% to about 10.0%, by weight, of the detergent compositions herein, typically from about 0.1% to about 5%, preferably from about 0.2% to about 3.0%.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. Said soil release agent also comprises from about 0.5% to about 20%, by weight of the oligomer, of a crystalline-reducing stabilizer, preferably selected from the group consisting of xylene sulfonate, cumene sulfonate, toluene sulfonate, and mixtures thereof.

As a practical matter, and not by way of limitation, the compositions and processes herein can be adjusted to provide on the order of at least one part per ten million of the active bleach catalyst species in the aqueous washing liquor, and will preferably provide from about 0.1 ppm to about 700 ppm, more preferably from about 1 ppm to about 500 ppm, of the catalyst species in the laundry liquor.

Bleaching Compounds—Bleaching Agents and Bleach Activators

The detergent compositions herein may optionally contain bleaching agents or bleaching compositions containing a bleaching agent and one or more bleach activators. When present, bleaching agents will typically be at levels of from 1% to 40%, more typically from 5% to 30%, of the detergent composition, especially for fabric laundering. If present, the amount of bleach activators will typically be from 0.1% to 60%, more typically from 0.5% to 40% of the bleaching composition comprising the bleaching agent-plus-bleach activator.

The bleaching agents used herein can be any of the bleaching agents useful for detergent compositions in textile cleaning, hard surface cleaning, or other cleaning purposes that are now known or become known. These include oxygen bleaches as well as other bleaching agents.

Peroxygen bleaching agents can also be used. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Preferred coatings are based on carbonate/sulphate mixtures. Percarbonate is available from various commercial sources such as FMC, Solvay and Tokai Denka.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, issued Nov. 20, 1984, U.S. patent application Ser. No. 740,446, Bums et al, filed Jun. 3, 1985, European Patent Application 0,133,354, Banks et al, published Feb. 20, 1985, and U.S. Pat. No. 4,412,934, Chung et al, issued Nov. 1, 1983. Highly preferred bleaching agents also include 6-nonylamino-6-oxoperoxycaproic acid as described in U.S. Pat. No. 4,634,551, issued Jan. 6, 1987 to Bums et al.

Mixtures of bleaching agents can also be used. Peroxygen bleaching agents, the perborates, e.g., sodium perborate (e.g., mono- or tetra-hydrate), the percarbonates, etc., are preferably combined with bleach activators, which lead to the in situ production in aqueous solution (i.e., during the washing process) of the peroxy acid corresponding to the bleach activator. Various nonlimiting examples of activators are disclosed in U.S. Pat. No. 4,915,854, issued Apr. 10, 1990 to Mao et al, and U.S. Pat. No. 4,412,934. The nonanoyloxybenzene sulfonate (NOBS) and tetraacetyl ethylene diamine (TAED) activators are typical, and mixtures thereof can also be used. See also U.S. Pat. No. 4,634,551 for other typical bleaches and activators useful herein.

Highly preferred amido-derived bleach activators are those of the formulae:

$$R^1N(R^5)C(O)R^2C(O)L \text{ or } R^1C(O)N(R^5)R^2C(O)L$$

wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydroxyl anion. A preferred leaving group is phenol sulfonate.

Preferred examples of bleach activators of the above formulae include (6-octanamido-caproyl) oxybenzenesulfonate, (6-nonanamidocaproyl)-oxybenzenesulfonate, (6-decanamidocaproyl) oxybenzenesulfonate, and mixtures thereof as described in U.S. Pat. No. 4,634,551, incorporated herein by reference.

Another class of bleach activators comprises the benzoxazin-type activators disclosed by Hodge et al in U.S. Pat. No. 4,966,723, issued Oct. 30, 1990, incorporated herein by reference. A highly preferred activator of the benzoxazin-type is:

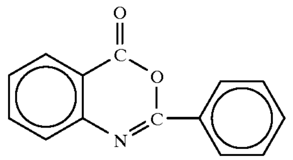

Still another class of preferred bleach activators includes the acyl lactam activators, especially acyl caprolactams and acyl valerolactams of the formulae:

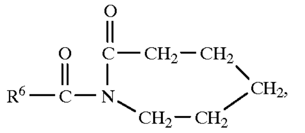

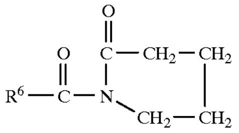

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, decanoyl valerolactam, undecenoyl valerolactam, nonanoyl valerolactam, 3,5,5-trimethylhexanoyl valerolactam and mixtures thereof. See also U.S. Pat. No. 4,545,784, issued to Sanderson, Oct. 8, 1985, incorporated herein by reference, which discloses acyl caprolactams, adsorbed into sodium perborate. Other preferred activators are cationic bleach activators.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from 0.025% to 1.25%, by weight, of such bleaches, especially sulfonate zinc phthalocyanine.

If desired, the bleaching compounds can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and European Pat. App. Pub. Nos. 549,271A1, 549,272A1, 544,440A2, and 544,490A1; Preferred examples of these catalysts include $Mn^{IV}_2(u\text{-}O)_3(1,4,7\text{-trimethyl-}1,4,7\text{-triazacyclononane})_2(PF_6)_2$, $Mn^{III}_2(u\text{-}O)_1(u\text{-}OAc)_2(1,4,7\text{-trimethyl-}1,4,7\text{-triazacyclononane})_2\text{-}(ClO_4)_2$, $Mn^{IV}_4(u\text{-}O)_6(1,4,7\text{-triazacyclononane})_4(ClO_4)_4$, $Mn^{III}Mn^{IV}_4(u\text{-}O)_1(u\text{-}OAc)_2\text{-}(1,4,7\text{-trimethyl-}1,4,7\text{-triazacyclononane})_2(ClO_4)_3$, $Mn^{IV}(1,4,7\text{-trimethyl-}1,4,7\text{-triazacyclononane})\text{-}(OCH_3)_3(PF_6)$, and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.:

4,728,455; 5,284,944; 5,246,612; 5,256,779; 5,280,117; 5,274,147; 5,153,161; 5,227,084.

Polymeric Dispersing Agents

Polymeric dispersing agents can advantageously be utilized at levels from 0.1% to 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersinglanti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 70:30 to 30:70. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol or acetate terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antiredeposition agent. Typical molecular weight ranges for these purposes range from about 500 to about 100,000, preferably from about 1,000 to about 50,000, more preferably from about 1,500 to about 10,000.

Polyamino acid dispersing agents such as polyaspartate and polyglutamatemay also be used, especially in conjunction with zeolite builders. Dispersing agents such as polyaspartate preferably have a molecular weight (avg.) of about 10,000.

Dye Transfer Inhibiting Agents

The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from 0.01% to 10% by weight of the composition, preferably from 0.01 to 5%, and more preferably from 0. 05% to 2%.

More specifically, the polyamine N-oxide polymers preferred for use herein contain units having the following structural formula: R—$A_x$—P; wherein P is a polymerizable unit to which an N—O group can be attached or the N—O group can form part of the polymerizable unit or the N—O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures:

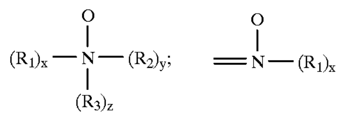

wherein $R_1$, $R_2$, $R_3$ are aliphatic, aromatic, heterocyclic or alicyclic groups or combinations thereof; x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a_ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO".

The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., *Chemical Analysis*, Vol 113. "Modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

The detergent compositions herein may also optionally contain from 0.005% to 5% by weight of certain types of hydrophilic optical brighteners which also provide a dye transfer inhibition action. If used, the compositions herein will preferably comprise from 0.01% to 1% by weight of such optical brighteners.

The hydrophilic optical brighteners useful in the present invention are those having the structural formula:

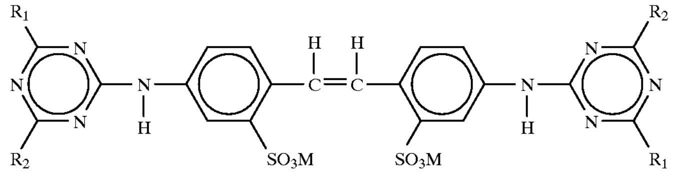

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4',-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation.

When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

The specific optical brightener species selected for use in the present invention provide especially effective dye transfer inhibition performance benefits when used in combination with the selected polymeric dye transfer inhibiting agents hereinbefore described. The combination of such selected polymeric materials (e.g., PVNO and/or PVPVI) with such selected optical brighteners (e.g., Tinopal UNPA-GX, Tinopal 5BM-GX and/or Tinopal AMS-GX) provides significantly better dye transfer inhibition in aqueous wash solutions than does either of these two detergent composition components when used alone. Without being bound by theory, it is believed that such brighteners work this way because they have high affinity for fabrics in the wash solution and therefore deposit relatively quick on these fabrics. The extent to which brighteners deposit on fabrics in the wash solution can be defined by a parameter called the "exhaustion coefficient". The exhaustion coefficient is in general as the ratio of a) the brightener material deposited on fabric to b) the initial brightener concentration in the wash liquor. Brighteners with relatively high exhaustion coefficients are the most suitable for inhibiting dye transfer in the context of the present invention.

Of course, it will be appreciated that other, conventional optical brightener types of compounds can optionally be used in the present compositions to provide conventional fabric "brightness" benefits, rather than a true dye transfer inhibiting effect. Such usage is conventional and well-known to detergent formulations.

According to the present invention the detergent composition may comprise any other ingredients commonly employed in conventional detergent compositions such as soaps, suds suppressors, softeners, brighteners, additional enzymes and enzyme stabilisers.

Use of the Combination of Nonionic Polysaccharide Ethers and Cellulase Enzymes

The compositions of the present invention may be used in laundry detergent compositions, fabric treatment compositions and fabric softening compositions in addition to hard surface cleaners. The compositions may be formulated as conventional granules, bars, pastes or powder or non aqueous liquid forms. The detergent compositions are manufactured in conventional manner, for example in the case of powdered detergent compositions, spray drying or spray mixing processes may be utilised.

The polysaccharide ether and cellulase enzyme combination of the present invention are present at aqueous concentrations of from 1 ppm to 300 ppm, preferably from 5 ppm to 100 ppm in the wash solution, preferably at a pH of from 7 to 11, more preferably from 9 to 10.5.

The present invention also relates to a method of laundering fabrics which comprises contacting said fabric with an aqueous laundry liquor containing conventional detersive ingredients described herein in addition to the cellulolytic enzyme and nonionic polysaccharide ether of the present invention. In a preferred method polyester and polyester-cotton blends and other synthetic fabrics are used. The most preferred method for simultaneously cleaning and soil release treatment is a "multi-cycle" method, whereby the best results are obtained after two or more cycles comprising the steps of:

a) contacting said fabric with said aqueous laundry liquor in a conventional automatic washing machine or by hand washing for periods of from about 5 minutes to about 1 hour;

b) rinsing said fabrics with water c) line- or tumble drying said fabrics; and d) exposing said fabrics to soiling through normal wear or domestic use.

EXAMPLES

Abbreviations Used in Examples

In the detergent compositions, the abbreviated component identifications have the following meanings:

XYAS: Sodium $C_{1X}$–$C_{1Y}$ alkyl sulphate

25EY: A $C_{12-15}$ predominantly linear primary alcohol condensed with an average of Y moles of ethylene oxide XYEZ: A $C_{1x}$–$C_{1y}$ predominantly linear primary alcohol condensed with an average of Z moles of ethylene oxide XYEZS: $C_{1X-C1Y}$ sodium alkyl sulphate condensed with an average of Z moles of ethylene oxide per mole TFAA: $C_{16}$–$C_{18}$ alkyl N-methyl glucamide.

Silicate: Amorphous Sodium Silicate ($SiO_2$:$Na_2O$ ratio=2.0)

NaSKS-6: Crystalline layered silicate of formula δ-$Na_2Si_2O_5$

Carbonate: Anhydrous sodium carbonate

MA/AA: Copolymer of 30:70 maleic/acrylic acid, average molecular weight about 70,000.

Zeolite A: Hydrated Sodium Aluminosilicate of formula $Na_{12}(A1O_2SiO_2)_{12}$. $27H_2O$ having a primary particle size in the range from 1 to 10 micrometers Citrate: Tri-sodium citrate dihydrate Percarbonate: Anhydrous sodium percarbonate bleach coated with a coating of sodium silicate ($Si_2O$:$Na_2O$ ratio=2:1) at a weight ratio of percarbonate to sodium silicate of 39:1

CMC: Sodium carboxymethyl cellulose

DETPMP: Diethylene triamine penta (Methylene phosphonic acid), marketed by Monsanto under the Tradename Dequest 2060

PVNO: Poly (4-vinylpyridine)-N-oxide copolymer of vinylimidazole and vinylpyrrolidone having an average molecular weight of 10,000.

Smectite Clay: Calcium montmorillonite ex. Colin Stewart Minchem Ltd.

Granular Suds: 12% Silicone/silica, 18% stearyl Suppressor alcohol, 70% starch in granular form LAS: Sodium linear $C_{12}$ alkyl benzene sulphonate TAS: Sodium tallow alkyl sulphate SS: Secondary soap surfactant of formula 2-butyl octanoic acid Phosphate: Sodium tripolyphosphate TAED: Tetraacetyl ethylene diamine PVP: Polyvinyl pyrrolidone polymer HMWPEO: High molecular weight polyethylene oxide MC1: Methyl cellulose ether with dp=650, ds=1.8 available from Shin Etsu Chemicals MC2: Methyl cellulose ether (Methol 60 HG) obtained from Fluka, with a dp>100 and ds >1

HPMC: Hydroxypropyl methylcellulose ether with dp=300–350, 28–30% methoxyl content Cellulase: Cellulolytic enzyme sold under the tradename of Carezyme or Celluzyme by Novo Nordisk A/S TAE 25 : Tallow alcohol ethoxylate (25)

Example 1

The following laundry detergent compositions A, B. C, D and E were prepared.

| | A | B | C | D | E |
|---|---|---|---|---|---|
| 45AS/25AS 3:1 | 9.1 | 9.1 | 9.1 | 9.1 | 9.1 |
| 35AE3S | 2.3 | 2.3 | 2.3 | 2.3 | 2.3 |
| 24E5 | 4.5 | 4.5 | 4.5 | 4.5 | 4.5 |
| TFAA | 2.0 | 2.0 | 2.0 | 2.0 | 2.0 |
| Zeolite A | 10.2 | 10.2 | 10.2 | 10.2 | 10.2 |
| Cellulase (1000 CEVU) | 0.1 | 0.3 | 0.2 | 0.6 | 0.05 |
| MC2 | 0.6 | 0.8 | 0.16 | 0.36 | 0.55 |
| Na SKS-6/citric acid (79:21) | 10.6 | 10.6 | 10.6 | 10.6 | 10.6 |
| Carbonate | 7.6 | 7.6 | 7.6 | 7.6 | 7.6 |
| TAED | 5 | 6.67 | 6.67 | 6.67 | 6.67 |
| Percarbonate | 22.5 | 22.5 | 22.5 | 22.5 | 22.5 |
| DETPMP | 0.5 | 0.5 | 0.5 | 0.5 | 0.5 |
| Protease | 0.55 | 0.55 | 0.55 | 0.55 | 0.55 |
| Polycarboxylate | 3.1 | 3.1 | 3.1 | 3.1 | 3.1 |
| CMC | 0.4 | 0.4 | 0.4 | 0.4 | 0.4 |
| PVNO | 0.03 | 0.03 | 0.03 | 0.03 | 0.03 |
| Granular suds suppressor | 1.5 | 1.5 | 1.5 | 1.5 | 1.5 |
| Minors/misc to 100% | | | | | |

Example 2

Granular fabric cleaning compositions in accord with the invention are prepared as follows:

| | I | II |
|---|---|---|
| Cellulase (1000 CEVU) | 0.2 | 0.1 |
| MC1 | 0.75 | — |
| HPMC | — | 0.5 |
| LAS | 22.0 | 22.0 |
| Phosphate | 23.0 | 23.0 |
| Carbonate | 23.0 | 23.0 |
| Silicate | 14.0 | 14.0 |
| Zeolite A | 8.2 | 8.2 |
| DETPMP | 0.4 | 0.4 |
| Sodium Sulfate | 5.5 | 5.5 |
| Water/minors | Up to 100% | |

Example 3

Granular fabric cleaning compositions in accord with the invention are prepared as follows:

| | I | II |
|---|---|---|
| LAS | 12.0 | 12.0 |
| Zeolite A | 26.0 | 26.0 |
| SS | 4.0 | 4.0 |
| 24AS | 5.0 | 5.0 |
| Citrate | 5.0 | 5.0 |
| Sodium Sulfate | 17.0 | 17.0 |

-continued

| | I | II |
|---|---|---|
| Perborate | 16.0 | 16.0 |
| TAED | 5.0 | 5.0 |
| HPMC | 0.3 | 0.5 |
| MC1 | 0.75 | — |
| Cellulase (1000 CEVU) | 0.1 | 0.3 |
| Water/minors | Up to 100% | |

Example 4

Granular fabric cleaning compositions in accord with the invention which are especially useful in the laundering of coloured fabrics are prepared as follows:

| | I | II | III | IV | V | VI |
|---|---|---|---|---|---|---|
| LAS | 11.4 | 10.7 | 11.4 | 10.7 | — | — |
| TAS | 1.8 | 2.4 | 1.8 | 2.4 | — | — |
| TFAA | — | — | — | — | 4.0 | 4.0 |
| 45AS | 3.0 | 3.1 | 3.0 | 3.1 | 10.0 | 10.0 |
| 45E7 | 4.0 | 4.0 | 4.0 | 4.0 | — | — |
| 25E3S | — | — | — | — | 3.0 | 3.0 |
| 68E11 | 1.8 | 1.8 | 1.8 | 1.8 | — | — |
| 25E5 | — | — | — | — | 8.0 | 8.0 |
| Citrate | 14.0 | 15.0 | 14.0 | 15.0 | 7.0 | 7.0 |
| Carbonate | — | — | — | — | 10 | 10 |
| Citric acid | 3.0 | 2.5 | 3.0 | 2.5 | 3.0 | 3.0 |
| Zeolite A | 32.5 | 32.1 | 32.5 | 32.1 | 25.0 | 25.0 |
| Na-SKS-6 | — | — | — | — | 9.0 | 9.0 |
| MA/AA | 5.0 | 5.0 | 5.0 | 5.0 | 5.0 | 5.0 |
| DETPMP | 1.0 | 0.2 | 1.0 | 0.2 | 0.5 | 0.8 |
| HPMC | — | — | 0.5 | — | 0.5 | — |
| MC1 | 0.75 | 0.75 | — | 0.75 | — | 0.75 |
| Cellulase (1000 CEVU) | 0.1 | 0.15 | 0.3 | 0.2 | 0.05 | 0.5 |
| Silicate | 2.0 | 2.5 | 2.0 | 2.5 | — | — |
| Sulphate | 3.5 | 5.2 | 3.5 | 5.2 | 3.0 | 3.0 |
| PVP | 0.3 | 0.5 | 0.3 | 0.5 | — | — |
| Poly(4-vinyl pyridine)-N-oxide/copoly mer of vinyl-imidazote & vinyl-pyrrolidone | — | — | — | — | 0.2 | 0.2 |
| Perborate | 0.5 | 1.0 | 0.5 | 1.0 | — | — |
| Phenol sulfonate | 0.1 | 0.2 | 0.1 | 0.2 | — | — |
| Water/Minor s | Up to 100% | | | | | |

Example 5

Granular fabric cleaning compositions in accord with the invention are prepared as follows:

| | I | II |
|---|---|---|
| LAS | 6.5 | 8.0 |
| Sulfate | 15.0 | 18.0 |
| Zeolite A | 26.0 | 22.0 |
| Sodium nitrilotriacetate | 5.0 | 5.0 |
| PVP | 0.5 | 0.7 |
| TAED | 3.0 | 3.0 |
| Boric acid | 4.0 | — |
| Perborate | 0.5 | 1.0 |
| Phenol sulphonate | 0.1 | — |
| HPMC | 0.5 | — |
| MC1 | — | 0.75 |
| Cellulase (1000 CEVU) | 0.1 | 0.2 |
| Silicate | 5.0 | 5.0 |

-continued

| | I | II |
|---|---|---|
| Carbonate | 15.0 | 15.0 |
| Water/minors | Up to 100% | |

Example 6

A granular fabric cleaning compositions in accord with the invention which provide "softening through the wash" capability are prepared as follows:

| | I | II | III | IV |
|---|---|---|---|---|
| 45AS | — | — | 10.0 | 10.0 |
| LAS | 7.6 | 7.6 | — | — |
| G8AS | 1.3 | 1.3 | — | — |
| 45E7 | 4.0 | 4.0 | — | — |
| 25E3 | — | — | 5.0 | 5.0 |
| Coco-alkyl-dimethyl hydroxy-ethyl ammonium chloride | 1.4 | 1.4 | 1.0 | 1.0 |
| Citrate | 5.0 | 5.0 | 3.0 | 3.0 |
| Na-SKS-6 | — | — | 11.0 | 11.0 |
| Zeolite A | 15.0 | 15.0 | 15.0 | 15.0 |
| MA/AA | 4.0 | 4.0 | 4.0 | 4.0 |
| DETPMP | 0.4 | 0.4 | 0.4 | 0.4 |
| Perborate | 15.0 | 15.0 | — | — |
| Percarbonate | — | — | 15.0 | 15.0 |
| TAED | 5.0 | 5.0 | 5.0 | 5.0 |
| Smectite clay | 10.0 | 10.0 | 10.0 | 10.0 |
| HMWPEO | — | — | 0.1 | 0.1 |
| HPMC | — | 0.5 | — | 0.5 |
| MC1 | 0.75 | — | 0.75 | — |
| Cellulase (1000 CEVU) | 0.1 | 0.2 | 0.05 | 0.37 |
| Silicate | 3.0 | 3.0 | 5.0 | 5.0 |
| Carbonate | 10.0 | 10.0 | 10.0 | 10.0 |
| Granular suds suppressor | 1.0 | 1.0 | 4.0 | 4.0 |
| CMC | 0.2 | 0.2 | 0.1 | 0.1 |
| Water/minors | | | Up to 100% | |

What is claimed is:

1. A detergent composition comprising the following: 1% to 80% by weight of a detergent surfactant; (b) a nonionic polysaccharide ether having a 1,4 β-glucosidic bond, a degree of polymerization of 100 or more and a degree of substitution of from 0.5 to 2.8 inclusive; (c) a cellulolytic enzyme; (d) 0.1% to 10% by weight of a chelating agent selected from the group consisting of amino carboxylates, aminophosphonates, dihydroxydisulfobenzenes, and mixtures thereof; (e) 0.01% to 10% by weight of a dye transfer inhibiting agent selected from the group consisting of polyamine N-oxide polymers, copolymers of N-vinylpyrrolidone and N-vinylimidazole and mixtures thereof.

2. A detergent composition according to claim 1, wherein said nonionic polysaccharide ether is selected from the group consisting of nonionic $C_1$–$C_4$ alkyl-, $C_1$–$C_4$ hydroxyalkyl-, $C_1$–$C_4$ alkylhydroxyalkyl cellulose ethers and mixtures thereof.

3. A detergent composition according to claim 1, wherein said cellulolytic enzyme is derivable from a strain of Humicola, Bactillus, Trichoderma, Fusarium, Myceliophthora, Phanerochaete, Schizophyllum, Penicillium, Aspergillus, or Geotricum.

4. A detergent composition according to claim 1, wherein the cellulolytic enzyme is a endoglucanase which is immunoreactive with antibody raised against a highly purified ~43 kD endoglucanase derived from Humicola insolens, DMS 1800, or which is a derivative of the ~43 kD endoglucanase exhibiting cellulolytic enzyme activity.

5. A detergent composition according to claim 1, wherein the ratio of said cellulolytic enzyme to said nonionic polysaccharide ether is from 1:100 to 100:1.

6. A detergent composition according to claim 1, wherein said cellulolytic enzyme is present in a concentration in the wash liquor of from 0.001 mg to 100 mg of cellulolytic enzyme per liter of washing solution.

7. A detergent composition according to claim 1, wherein said detergent composition comprises from 0.001% to 2%, by weight, of 1000 CEVU active cellulolytic enzyme.

8. A detergent composition according to claim 1, wherein the dye transfer inhibiting agent is a polyvinylpyrrolidone.

9. A detergent composition according to claim 1, further comprising from 0.005% to 5%, by weight, of a hydrophilic optical brightener having the formula:

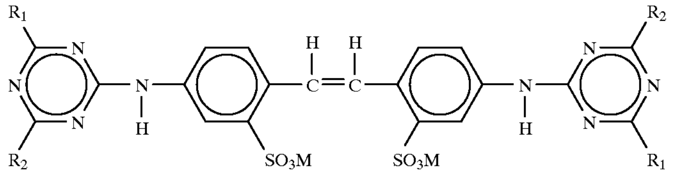

wherein $R_1$ is anilino, N-2-bis-hydroxyethyl, or NH-2-hydroxyethyl;

$R_2$ is N-2-bis-hydroxyethyl, N-2-hydroxyethyl-N-methylamino, morphilino, chloro or amino, and M is sodium or potassium.

10. A detergent composition according to claim 1, comprising from 5% to 50%, by weight, of a surfactant, wherein the surfactant comprises an ingredient selected from the group consisting of linear alkyl benzene sulfonates, alkyl sulfates, alkyl alkoxylated nonionic and mixtures thereof.

11. A method of treating fabrics comprising contacting said fabric with an aqueous liquor comprising from 1 ppm to 300 ppm of a composition according to claim 1.

12. A detergent composition according to claim 1 further comprising a bleach activator having the formula:

$$R^1N(R^5)C(O)R^2C(O)L \text{ or } R^1C(O)N(R^5)R^2C(O)L$$

Wherein $R^1$ is an alkyl containing from about 6 to about 12 carbon atoms; $R^2$ is an alkylene containing from 1 to about 6 carbon atoms; $R^5$ is H, an aryl, or an alkyl containing from about 1 to 10 carbon atoms; and L is a leaving group.

* * * * *